Dec. 15, 1931.  H. J. KLEPPE  1,836,376
RADIUS ROD CONSTRUCTION
Filed July 12, 1926
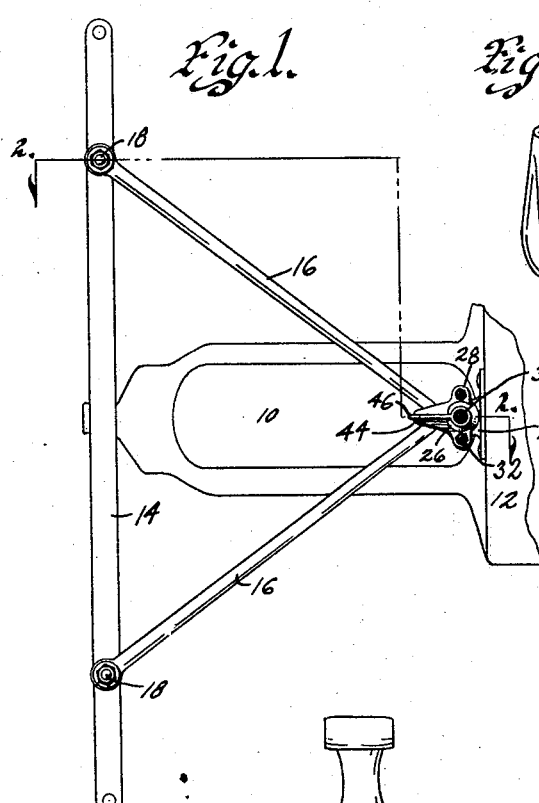
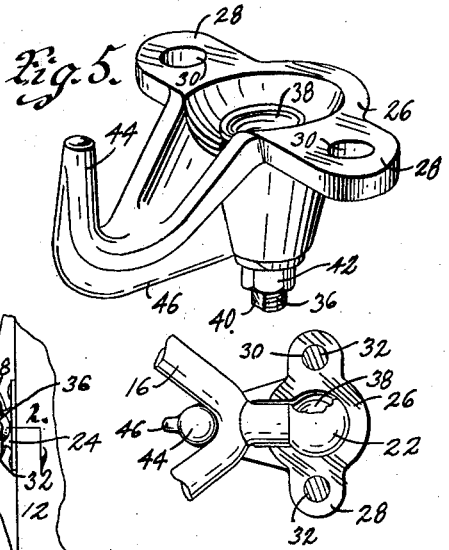
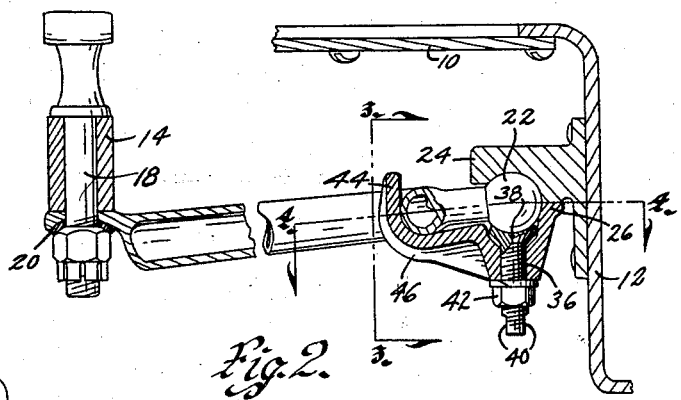
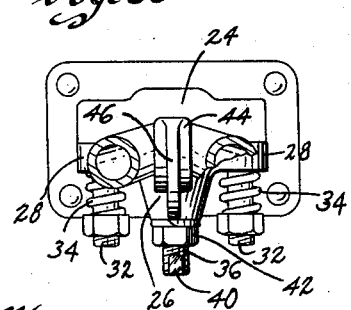
Inventor
Herman J. Kleppe
by Bair & Freeman Attorneys
Witness Patented Dec. 15, 1931

1,836,376

UNITED STATES PATENT OFFICE

HERMAN J. KLEPPE, OF NORWAY, IOWA

RADIUS ROD CONSTRUCTION

Application filed July 12, 1926. Serial No. 121,921.

The object of my invention is to provide a radius rod construction or attachment for radius rods wherein the ball end thereof may be adjusted in its socket and held against loose setting and practically avoids rattling and looseness of the parts.

More particularly it is my object to provide a socket cap adapted to project under and cover a portion of the ball end of a radius rod and to provide a screw in said cap having a ball seat head for engaging the ball end of the radius rod whereby it may be securely held in position.

Still a further object is to provide a hook arm on the socket cap adapted to project beneath a portion of the radius rod and to be received between the two sides of the V-shaped radius rod adjacent the apex end thereof so that in case the ball end of the radius rod should for some reason become loose from its socket or bearing, the hook arm will retain the radius rod against pulling out from the same.

With these and other objects in view, my invention consists in the construction, arrangement and combination of the various parts of my radius rod construction, whereby the objects contemplated are attained, as hereinafter more fully set forth, pointed out in my claim, and illustrated in the accompanying drawings, in which:

Figure 1 is a bottom plan view of the crank case and front axle of an automobile with the radius rod connected thereon and my improved device in position thereon.

Figure 2 is a sectional view taken on line 2—2 of Figure 1.

Figure 3 is a detail sectional view taken on line 3—3 of Figure 2.

Figure 4 is a sectional view taken on line 4—4 of Figure 2.

Figure 5 is a perspective view of the socket cap and hook arm which constitute my attachment, and Figure 6 is a detail view of a bushing or washer used in connection with the radius rod fastenings to the front axle.

In the accompanying drawings I have used the reference numeral 10 to indicate generally the bottom of the crank case pan of an automobile and 12 the fly wheel casing.

My invention is preferably adapted for use in connection with the radius rods of the well-known make of automobiles of the Ford type.

A front axle 14 is connected to the engine of the automobile particularly the fly wheel casing 12 by a V-shaped radius rod construction 16. The V-shaped radius rod has its outer or spaced ends connected to bolts or the like 18 found upon the automobile which are secured to the axle 14.

I place a curved washer 20 between the spindle 18 and the outer ends of the radius rod 16 for preventing looseness of the parts. The apex end of the radius rod 16 is formed with a ball 22 adapted to be received in a ball socket member 24.

The ball socket member 24 is riveted or otherwise secured to the casing 12. In order to hold the ball end 22 within the socket member 24 I provide a socket cap 26 of the shape illustrated in Figure 5 of the drawings.

The socket member 24 is already provided upon the automobile and I substitute for the ordinary socket cap the screw cap 26 shown in Figure 5. This socket cap 26 is formed preferably of cast material and has a pair of outwardly extending fastening flanges 28 formed with openings 30 through which fastening bolts 32 may be extended.

The bolts 32 extend up into the socket member 24. Between the heads or nuts on the bolts 32 are placed coil springs 34 which tend to hold the socket cap in engagement with the outside of the socket member 24 and incidentally holds the ball end 22 in position.

The tension upon the springs 34 may be varied by adjusting the nuts upon the bolts 32. When the bolts 32 have been tightened as much as possible then and thereafter any wear upon the ball end 22 or the socket member 24 will cause the ball end 22 to become loose relative to the socket member 24.

In order to overcome this looseness I provide an adjusting screw 36 in the socket cap 26. The adjusting screw 36 is formed with a ball seat head 38 adapted to engage a portion of the ball end 22 and to force it upwardly into contact with the socket member 24.

The adjusting screw 36 has its lower end flattened as at 40 for permitting a wrench or the like to be attached thereto for rotating the screw. A lock washer and bolt 42 is placed upon the screw 36 whereby the adjusting screw may be locked against further rotation after it has once been adjusted.

It will be seen that it is an easy matter to adjust the adjusting screw 36 and at all times hold the ball end 22 against rattle or looseness relative to the socket member 24. Formed integral with the socket cap 26 and extending forwardly and upwardly therefrom as clearly illustrated in Figure 5, is a hook arm 44.

The hook arm 44 forms part of the casting of the socket cap 26 and is ribbed as at 46 for giving strength to the entire casting. The hook arm 44 projects up between the two sides of the V-shaped radius rod at a point adjacent its apex.

The hook arm 44 being received at the junction of the side bars of the radius rod tends to hold the ball end within the socket member 24. If for any reason there would be a tendency of the ball 22 to pull out of its socket then the hook arm 44 engaging the radius rod at its apex would hold the ball against such pulling out movement.

In case the ball end 34 should become broken relative to the rest of the radius rod 16 then the hook arm would support the radius rod and prevent it from pulling forward.

It will be noted that the socket cap may be adjusted by the bolts 32 and held under tension by the springs 34 and that further adjustment of the ball 22 may be had by the adjusting screw 36.

The adjusting screw 36 may easily and quickly be engaged and insures a positive tight fitting connection between the ball 22 and the socket member 24.

Some changes may be made in the arrangement and construction of the parts of my radius rod construction, without departing from the real spirit and purpose of my invention, and it is my intention to cover by my claim any modified forms of structure or use of mechanical equivalents, which may be reasonably included within their scope.

I claim as my invention:

A socket member for the attachment of the ball end of a forked radius rod, a socket cap having attaching ears extending therefrom and adapted to be rigidly attached to said socket member and having a socket therein, the sockets of said cap and socket member registering to envelop the ball of said rod, a cup shaped member within the socket of said cap and an adjusting screw threaded through the bottom of said cap member into engagement with said cup shaped member and adapted to clamp said ball against the socket member.

Des Moines, Iowa, July 2, 1926.

HERMAN J. KLEPPE.